Dec. 17, 1968  E. R. MARK  3,416,197
LOOP-FORMING CABLE FITTING
Original Filed June 30, 1964
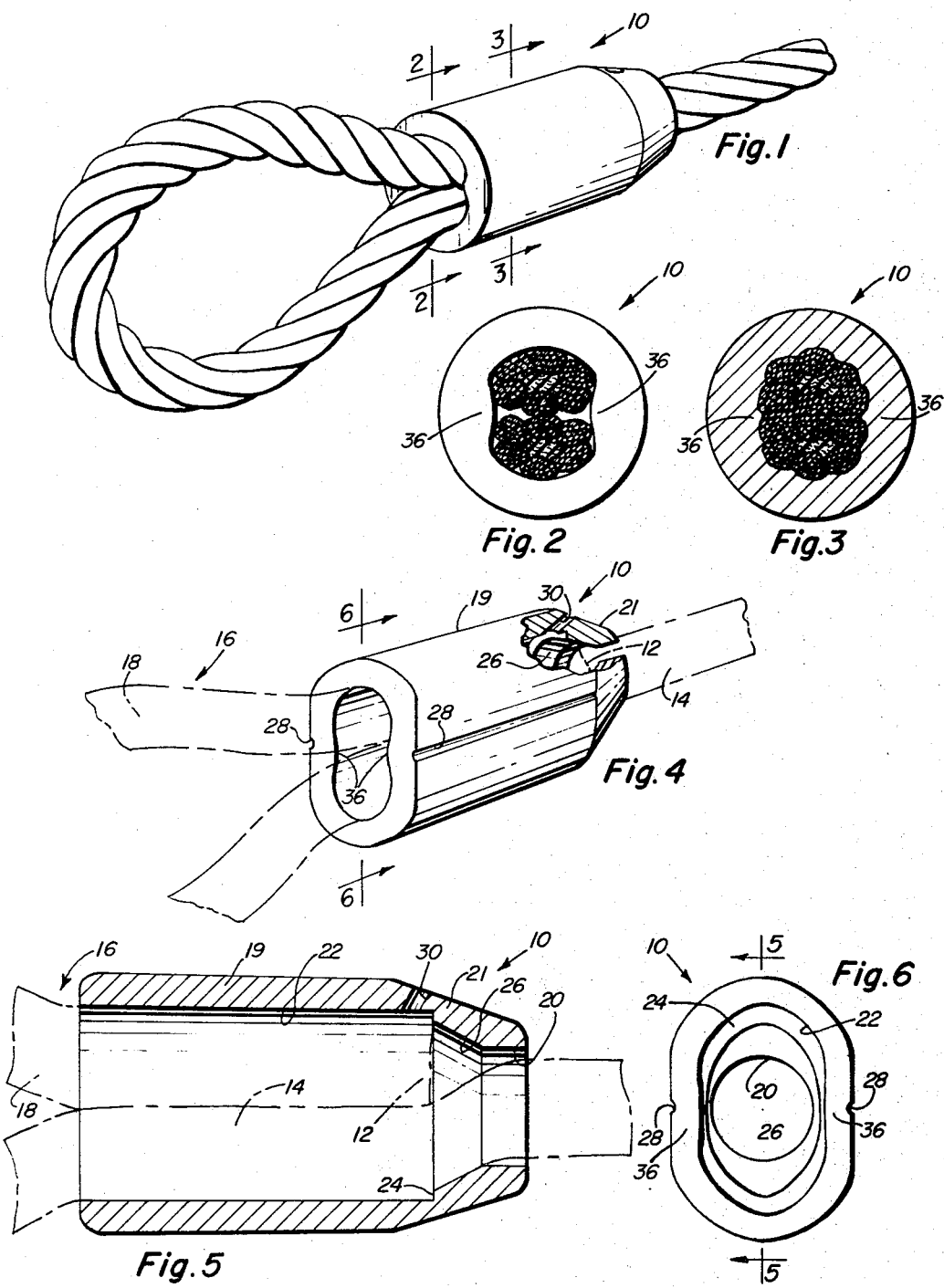
EDWARD R. MARK
INVENTOR
BY
BUCKHORN, BLORE, KLARQUIST & SPARKMAN
ATTORNEYS United States Patent Office 3,416,197
Patented Dec. 17, 1968

3,416,197
LOOP-FORMING CABLE FITTING
Edward R. Mark, 6819 NE. Broadway,
Portland, Oreg. 97213
Continuation of application Ser. No. 379,198, June 30, 1964. This application Sept. 6, 1966, Ser. No. 577,530
2 Claims. (Cl. 24—123)

ABSTRACT OF THE DISCLOSURE

A fitting for forming a loop in a cable is of initial elliptical cross-section with grooves along the center of its sides to eliminate flash upon compression of the fitting. The fitting has an interior shoulder to position the cable end, and is formed of cast brass of between 85 to 89 percent copper and 15 to 11 percent zinc.

Description

This is a continuation of application Ser. No. 379,198, filed on June 30, 1964, now abandoned.

This invention relates to a loop-forming cable fitting, and more particularly to a cable fitting for a wire cable sling.

Wire cable slings have been formed in the past by positioning end portions of the cables in loops in which the butt ends of the cables are held against the running portions of the cables by sleeves crimped or swaged thereon. In such a construction the sleeve or fitting should be of a strength such that the resulting joint will have at least 90% of the strength of the cable itself. With past known cable fittings, it has been difficult to prevent the sliding out of the butt end of the cable from the cable fitting, or stretching or belling out the fittings with a consequent weakening thereof. It would be desirable to provide a cable fitting which prevents slipping of the cable relative to the fitting when the cable is placed under load, and also be non-stretchable during continued use thereof. It would also be desirable to provide a cable fitting in which the butt end of the cable may be precisely positioned in the cable fitting prior to swaging the cable fitting onto th cable to provide maximum strength to the resulting joint.

An object of the invention is to provide a new and improved loop-forming cable fitting.

Another object of the invention is to provide a cable fitting for a wire cable sling.

A further object of the invention is to provide a cable fitting which holds a cable loop against slippage relative to the fitting and which does not stretch under extensive use.

Yet another object of the invention is to provide a cable fitting for holding an end portion of a wire cable in the form of a loop in which the butt end of the cable may be precisely located preparatory to swaging the cable fitting on the cable.

The invention provides a loop-forming cable fitting having a passage therethrough through which the running portion of a cable extends and into which the butt end of the cable extends. The fitting is swaged onto the enclosed portions of the cable to securely lock these portions of the cable together. Preferably the cable fitting has a peephole near one end thereof for observing the position of the butt end of the cable preparatory to swaging the fitting onto the cable, and the fitting is cast and is composed essentially of from 85 to 89% copper and from 15 to 11% zinc. The fitting, prior to swaging, also preferably has an elliptical, sleeve-like portion which is thicker at the long sides of the passage than at the short sides thereof.

A complete understanding of the invention may be obtained from the following detailed description of a loop-forming cable fitting forming a specific embodiment thereof, when read in conjunction with the appended drawings, in which:

FIG. 1 is a fragmentary, perspective view of a cable with a loop-forming cable fitting forming one embodiment of the invention;

FIG. 2 is a vertical sectional view taken substantially along line 2—2 of FIG. 1;

FIG. 3 is a vertical sectional view taken substantially along line 3—3 of FIG. 1;

FIG. 4 is a perspective view of the cable fitting of FIG. 1 prior to swaging the fitting onto the cable;

FIG. 5 is a vertical sectional view taken substantially along line 5—5 of FIG. 6; and FIG. 6 is a vertical sectional view taken substantially along line 6—6 of FIG. 4.

Referring now in detail to the drawings, a cable fitting or sleeve 10 forming one embodiment of the invention is swaged from an elliptical cross-sectional shape, as illustrated in FIGS. 4 to 6, to a substantially cylindrical exterior cross-sectional shape, as illustrated in FIGS. 1 to 3, to compress the fitting onto a butt end portion 12 and a portion 14 of a steel wire cable 16 to form a fixed loop or eye 18. The cable has twisted outer strands of steel wires and a center core of suitable material such as, for example, hemp or steel wires. The fitting 10 includes a sleeve-like main body portion 19 of substantially uniform cross-section throughout almost the entire length thereof. At the righthand end of the cable fitting, as viewed in FIG. 5, there is a tapered or frusto-conical blending portion 21 terminating in a short cylindrical bore 20, which is just slightly larger in diameter than that of the cable 16. The fitting 10 includes, in the main body portion thereof, a generally elliptical passage or bore 22 terminating in a shoulder 24 from which a frusto-conical passage 26 extends to the cylindrical bore 20. The main body portion has on the exterior surface thereof narrow grooves 28 positioned at the central portions of the longer sides of the generally elliptical main body section and extending the entire length of the main body portion. The shape of the passage 22 is such as to slidably receive the portion 14 and the butt end portion 12 of the cable 16 for locating these elements preparatory to swaging the fitting 10 thereon to securely lock the fitting to the portion 14 and the butt end portion 12. A peephole 30 is provided in the fitting adjacent the shoulder 24 to see that the butt end portion 12 is positioned against the shoulder and substantially fully inserted into the fitting 10 preparatory to swaging the fitting 10 onto the cable.

After the cable 16 has been located in the fitting 10 to form the loop 18 therein, of the desired size, the fitting is placed under compression by two U-shaped die members (not shown) of a type well known in the art, and the main body portion of the fitting is pressed tightly along the major axis of the ellipse to compress the main body portion into substantially the shape of a cylinder, and thicker central portions 36 of the longer sides of the ellipse are forced into the interstices of the portions of the cable adjacent thereto and the metal of the sleeve is flowed similarly into the interstices between the wires of the several strands of the cable and between the strands themselves to securely lock the fitting 10 to the portions of the cable enclosed within the main body portion of the fitting.

It has been found that the fitting 10 should be composed of a brass free of voids and having from about 85% to about 89% copper and from about 15% to about 11% zinc, with the best proportion being about 87% copper and about 13% zinc. These proportions must be maintained to provide the strength and rigidity necessary to prevent slippage of the cable relative to the sleeve and also to prevent stretching of the fitting by belling the fitting at the lefthand end thereof, as viewed in FIGS. 1 and 4, from the spreading effect on the fitting of the loop 18 of the cable 16. A variation of 1% either way outside the above range of percentages of the components of the fitting produces serious disadvantages in the fitting. If there is excess zinc the cable will slip relative to the fitting under load, while if there is excess copper the metal will stretch as the eye of the cable bells out the fitting to open up the fitting, both of these undesirable events being prevented if the fitting is kept closely within the proportions designated above.

Provision of the grooves 28 substantially eliminates the formation of flash as the swaging dies are closed in swaging the sleeve 10 onto the cable 16. This permits greater pressure to be placed on the swaging or clamping die members and a better grip is imparted to the fitting. Also, by having substantially no metal in flash, all the metal in the fitting is utilized to provide strength thereto. The fitting 10 is hard, preferably being cast to provide it with maximum strength. However, the fitting can be formed of cold extruded tubing with little or no annealing with sufficient cold working and a thicker wall than that of the cast fitting to make the hardness and strength of the fitting from the extruded tubing approaching those of the cast fitting.

The fitting 10 securely holds the loop 18 of the cable, prevents slippage of the cable relative to the fitting, and is easily formed and swaged onto the cable. Also, the butt end portion 12 of the cable is easily located in a position fully inserted into the fitting so that maximum holding power to the butt 12 of the cable is assured.

It is to be understood that the above-described arrangements are simply illustrative of the application of the principles of the invention. Numerous other arrangements may be readily devised by those skilled in the art which will embody the principles of the invention and fall within the spirit and scope thereof.

What is claimed is:
1. In a loop-forming cable fitting,
a sleeve having a passage including a short cylindrical end portion, a short frusto-conical portion tapering outwardly from the inner end of the cylindrical end portion, an elongated, generally elliptical main portion and a shoulder portion the juncture of the main portion and the frusto-conical portion, said shoulder extending perpendicularly to said main portion.
2. In a loop-forming cable fitting,
a sleeve of compressible material having a passage including a short cylindrical end portion, a short frusto-conical portion tapering outwardly from the inner end of the cylindrical end portion, an elongated, generally elliptical main portion and a shoulder portion at the juncture of the main portion and the frusto-conical portion,
the central portions of the sides of the elliptical main portion of the passage projecting into the passage and being of a thickness greater than that of the ends of the ellipse.

References Cited

UNITED STATES PATENTS

| 2,600,012 | 6/1952 | Macy. |
| 291,693 | 1/1884 | Cole. |
| 438,400 | 10/1890 | Brennen _____ 287—'8 |
| 2,327,683 | 8/1943 | Warner. |
| 2,346,412 | 4/1944 | Bratz. |
| 2,526,740 | 10/1950 | Gilmore. |
| 2,895,195 | 7/1959 | Ehmann. |
| 3,008,208 | 11/1961 | Stephen. |

FOREIGN PATENTS

| 1,355,968 | 2/1964 | France. |
| 872,728 | 7/1961 | Great Britain. |
| 949,043 | 2/1964 | Great Britain. |

BERNARD A. GELAK, *Primary Examiner.*

U.S. Cl. X.R.

29—199, 518